United States Patent
Moran et al.

(10) Patent No.: US 7,426,584 B2
(45) Date of Patent: Sep. 16, 2008

(54) PORTABLE STORAGE MEDIA AS FILE SERVERS

(75) Inventors: Dov Moran, Kfar Saba (IL); Amir Ban, Ramat Hasharon (IL)

(73) Assignee: Sandisk IL Ltd, Kfar Saba (IL)

( * ) Notice: Subject to any disclaimer, the term of this patent is extended or adjusted under 35 U.S.C. 154(b) by 0 days.

(21) Appl. No.: 10/268,892

(22) Filed: Oct. 11, 2002

(65) Prior Publication Data

US 2004/0073727 A1  Apr. 15, 2004

(51) Int. Cl.
*G06F 3/00* (2006.01)
*G06F 13/12* (2006.01)
*G06F 13/14* (2006.01)

(52) U.S. Cl. .............. 710/5; 710/62; 710/63; 710/64; 710/72; 710/13; 710/305

(58) Field of Classification Search ............ 710/62–64, 710/72, 8, 13, 301–304
See application file for complete search history.

(56) References Cited

U.S. PATENT DOCUMENTS

| | | | |
|---|---|---|---|
| 5,404,485 A | | 4/1995 | Ban |
| 5,799,168 A | | 8/1998 | Ban |
| 5,890,015 A | * | 3/1999 | Garney et al. ............... 710/62 |
| 5,928,347 A | * | 7/1999 | Jones ........................ 710/305 |
| 5,966,720 A | * | 10/1999 | Itoh et al. ..................... 711/1 |
| 6,148,354 A | * | 11/2000 | Ban et al. ................... 710/301 |
| 6,182,204 B1 | * | 1/2001 | Nakashima ................. 712/38 |
| 6,256,690 B1 | * | 7/2001 | Carper ....................... 710/301 |
| 6,279,069 B1 | * | 8/2001 | Robinson et al. ........... 711/103 |
| 6,405,278 B1 | * | 6/2002 | Liepe ......................... 711/103 |
| 6,484,290 B1 | * | 11/2002 | Chien et al. ................... 716/1 |
| 6,504,571 B1 | * | 1/2003 | Narayanaswami et al. ..................... 348/231.99 |
| 6,581,122 B1 | * | 6/2003 | Sarat .......................... 710/301 |
| 6,594,361 B1 | * | 7/2003 | Chaney et al. .............. 380/221 |
| 6,657,679 B2 | * | 12/2003 | Hayes et al. ................ 348/734 |
| 6,757,783 B2 | * | 6/2004 | Koh ........................... 711/115 |
| 6,779,063 B2 | * | 8/2004 | Yamamoto .................... 710/74 |
| 6,804,749 B2 | * | 10/2004 | Chien et al. ................. 711/115 |
| 6,886,083 B2 | * | 4/2005 | Murakami .................. 711/156 |
| 2001/0037420 A1 | * | 11/2001 | Sakamoto ................... 710/102 |

(Continued)

FOREIGN PATENT DOCUMENTS

EP  001100001 A2 *  5/2001

(Continued)

OTHER PUBLICATIONS

INTEL AP-686 Application Note, "Flash File System Selection Guide", Dec. 1998.*

(Continued)

*Primary Examiner*—Alan S. Chen
(74) *Attorney, Agent, or Firm*—Mark M. Friedman

(57) ABSTRACT

A data storage device includes a data storage medium, for example one or more flash memory modules, and a direct interface, to the data storage medium, that supports a file system protocol. Preferably, the data storable device also includes a physical communication interface such as a USB interface or a wireless interface, a user interface and a power source. The scope of the invention also includes appliances that include such data storage devices.

10 Claims, 4 Drawing Sheets

U.S. PATENT DOCUMENTS

| | | | |
|---|---|---|---|
| 2002/0099797 A1* | 7/2002 | Merrell et al. | 709/219 |
| 2003/0120604 A1* | 6/2003 | Yokota et al. | 705/57 |
| 2003/0154326 A1* | 8/2003 | Tseng et al. | 710/1 |
| 2004/0028068 A1* | 2/2004 | Kizhepat | 370/420 |

FOREIGN PATENT DOCUMENTS

| | | | |
|---|---|---|---|
| JP | 2001195553 | * | 7/2001 |

OTHER PUBLICATIONS

M-Systems Flash Disk Pioneers, White Paper, "Local Flash Disks: Two Architectures Compared", Amir Ban, Aug. 2001.*

Brett Glass, "There in a Flash: Flash Memory for Embedded Systems", Copyright 2000, available at www.embedded.com.*

* cited by examiner

PORTABLE STORAGE MEDIA AS FILE SERVERS

FIELD AND BACKGROUND OF THE INVENTION

The present invention relates to portable storage media and, more particularly, to a portable storage device with an on-board file system.

Data storage media exist in computer systems in many forms: magnetic disks ("hard disks"), floppy disks, CD ROMs, flash cards, magnetic tapes and others. By far, the most common use of storage media is to store data files that are used by the computer system's applications and operating software.

The paradigm universally used for file storage is that a file system that is part of the computer system's operating software organizes data into files and directories and provides computer programs access to a storage device that includes a physical storage medium, and this file system communicates with the storage device and controls the storage device through a low-level interface. According to this paradigm, the storage device itself acts as a blank slate responding to simple commands to read or write from physical locations. The storage device itself has no awareness of the higher-level organization of files and directories.

Thus, for example, a magnetic disk may be connected to a computer system through an Advanced Technology Attachment (ATA) interface, also known as an Intelligent Drive Electronics (IDE) interface. This interface includes a protocol of commands enabling the computer system to instruct the disk controller to read a given number of data bytes from a given physical location on the disk, or to write a given number of data bytes to a given physical location on the disk. While such operations normally are part of a higher-level context of some operation on a file, this disk or its controller is neither aware of it nor needs to be.

Magnetic disks, floppy disks, flash cards and most other storage media conform to the "block device" model. In abstract terms, a block device is a linear array of memory, subdivided into fixed-sized blocks, addressable by number. A block device is able to read or write, upon request, a block given the block number.

To be able to act as a disk, a device needs to be able to conform to the block device model, that is, to designate portions of memory as blocks and to provide read and write access to such blocks. A file system is usually able to handle several types of physical storage media by using the fact that each of them is a block device. That is to say, file operations are ultimately processed into one or more block read/write operations on the device, a task that is left to the physical device and its controller to execute.

By contrast, a file system typically is organized in a hierarchical manner. A hierarchical file system is based on a root directory that may include files and subdirectories. Each subdirectory, in turn, may include files and further subdirectories. Typically, each file is stored as one or more blocks in a physical storage medium, but the associated data storage device is not aware that the blocks in which a file is stored are related to each other, and also is not aware of the relationship between that file and the other files stored in the storage medium.

The paradigm in which storage devices physically act as block devices and are made into file servers by the computer host software is rooted in considerations of compatibility and cost: It is easy to standardize the block device interface and so make storage devices compatible with many computer systems, and such standards exist as in the above mentioned ATA standard as well as subsets of the Small Computer System Interface (SCSI) standard. On the other hand different operating systems tend to have different file systems, making the standardization at this level difficult. From an economic point of view, logic on a storage device adds to the cost of the device, while operating software on the computer host is less expensive or free, a fact that has driven the interface of storage devices to be as simple and basic as possible.

SUMMARY OF THE INVENTION

Flash storage media ("Flash disks") are a special case of block device media. Flash memory in itself is not naturally susceptible to the block device interface due to several physical limitation of Flash technology. In order to make Flash media act as disks, the makers of such media have devised intricate algorithms to emulate disks, and have put considerable resources on board the Flash device to execute such algorithms to emulate the block device interface needed to impersonate a disk. See, for example, U.S. Pat. Nos. 5,404,485 and 5,799,168, both to Ban, and U.S. Pat. No. 6,148,354 to Ban et al., all three of which patents are incorporated by reference for all purposes as if fully set forth herein. These resources often include a microprocessor, RAM and ROM resources. These resources, which already exist on these media, can also be used to run a file system.

Consequently, according to the present invention there is provided a data storage device including: (a) a data storage medium; and (b) a direct interface to the data storage medium, the direct interface supporting a file system protocol.

Preferably, the data storage medium includes at least one flash memory module.

Preferably, the direct interface supports a block protocol in addition to the file system protocol.

Preferably, the data storage medium and the direct interface share a common substrate. For example, in one preferred embodiment of the present invention, the data storage medium and the direct interface are both fabricated on the same integrated circuit chip.

Preferably, the data storage device of the present invention includes a physical communication interface that supports communication between the direct interface and an external device. In one embodiment of the present invention, the communication interface is a USB interface. In another embodiment of the present invention, the communication interface is a wireless communication interface.

Preferably, the direct interface is operative to initiate data transfers between the data storage medium and an external device. For this purpose, the data storage device of the present invention also includes a user interface with which a user of the data storage device instructs the direct interface to initiate the data transfers.

Preferably, the data storage device of the present invention also includes a power source for providing power to the direct interface.

The scope of the present invention also includes appliances that include data storage devices of the present invention. In the present context, an "appliance" is distinguished from a computer system in that the primary purpose of an "appliance" is something other than data processing. Examples of such appliances include cameras, audio players, video players remote control devices, and voice communication devices such as mobile telephones. Preferably, an appliance of the present invention also includes a physical communication interface for exchanging data between the data storage device and an external device. For example, a voice communication device of the present invention preferably includes a wireless communication interface for exchanging data between the data storage device and an external device, and a camera of the present invention preferably includes a USB interface for exchanging data between the data storage device and an external device.

It is an object of the present invention to provide storage media that maintain their own file systems and so can act as file servers.

It is an object of the present invention to provide a data storage device that acts as a file server and so can exchange data files with appliances that are not full computer systems and so do not have file systems of their own.

It is an object of the present invention to provide data storage devices that can exchange data files among themselves without the mediation of a computer system. For example, two businessmen equipped with data storage devices of the present invention are able to exchange electronic "business cards" by interfacing their data storage devices to each other.

It is an object of the present invention to provide a data storage device that can be accessed by a computer system that knows the file system protocol used by the device but is otherwise ignorant of implementation details such as the internal data layout and organization of the device.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a data storage device with an on-board file system.

The principles and operation of data storage devices according to the present invention may be better understood with reference to the drawings and the accompanying description.

Figure 1:
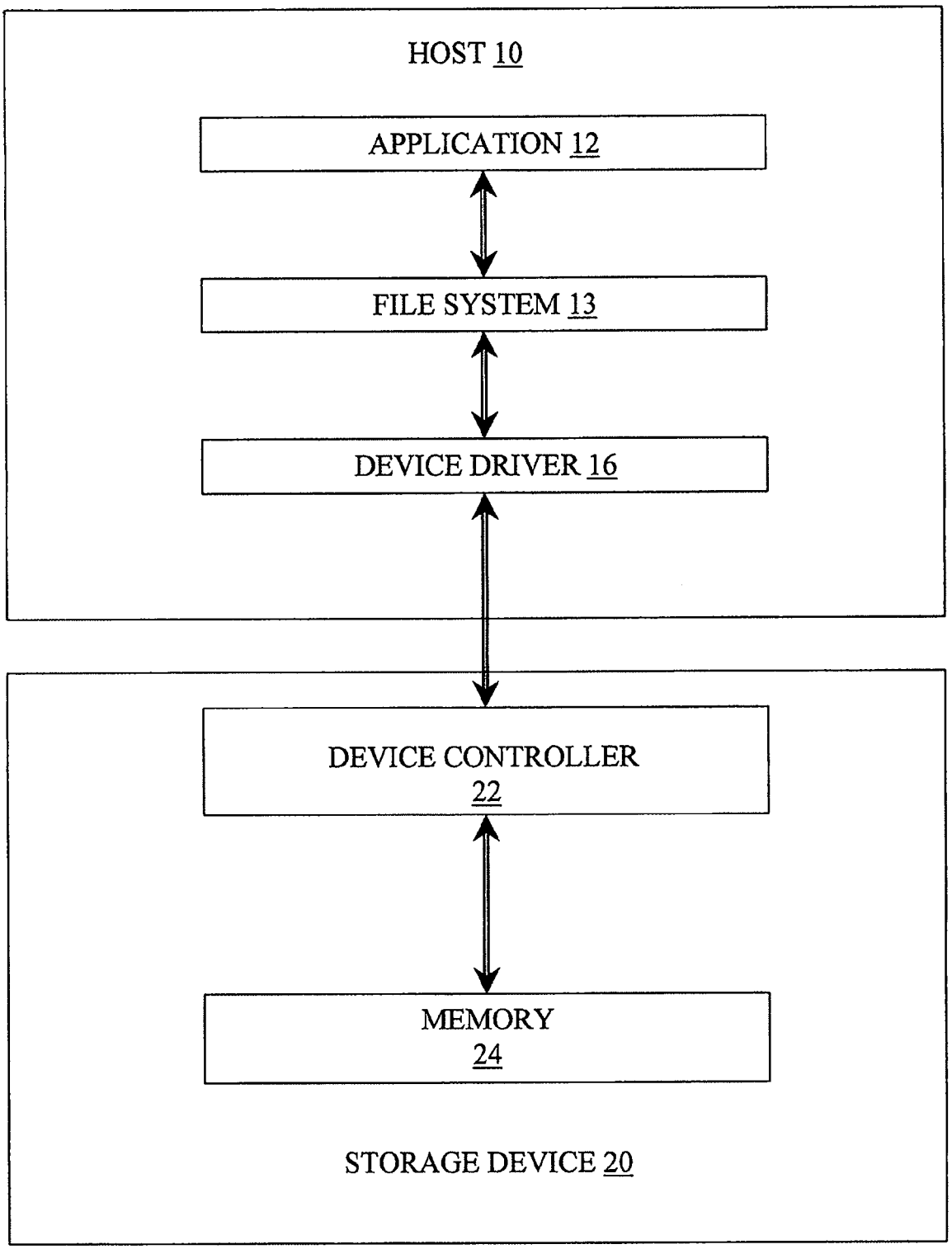
FIG. 1 illustrates the overall architecture of a host system coupled to a prior art data storage device.
Figure 2:
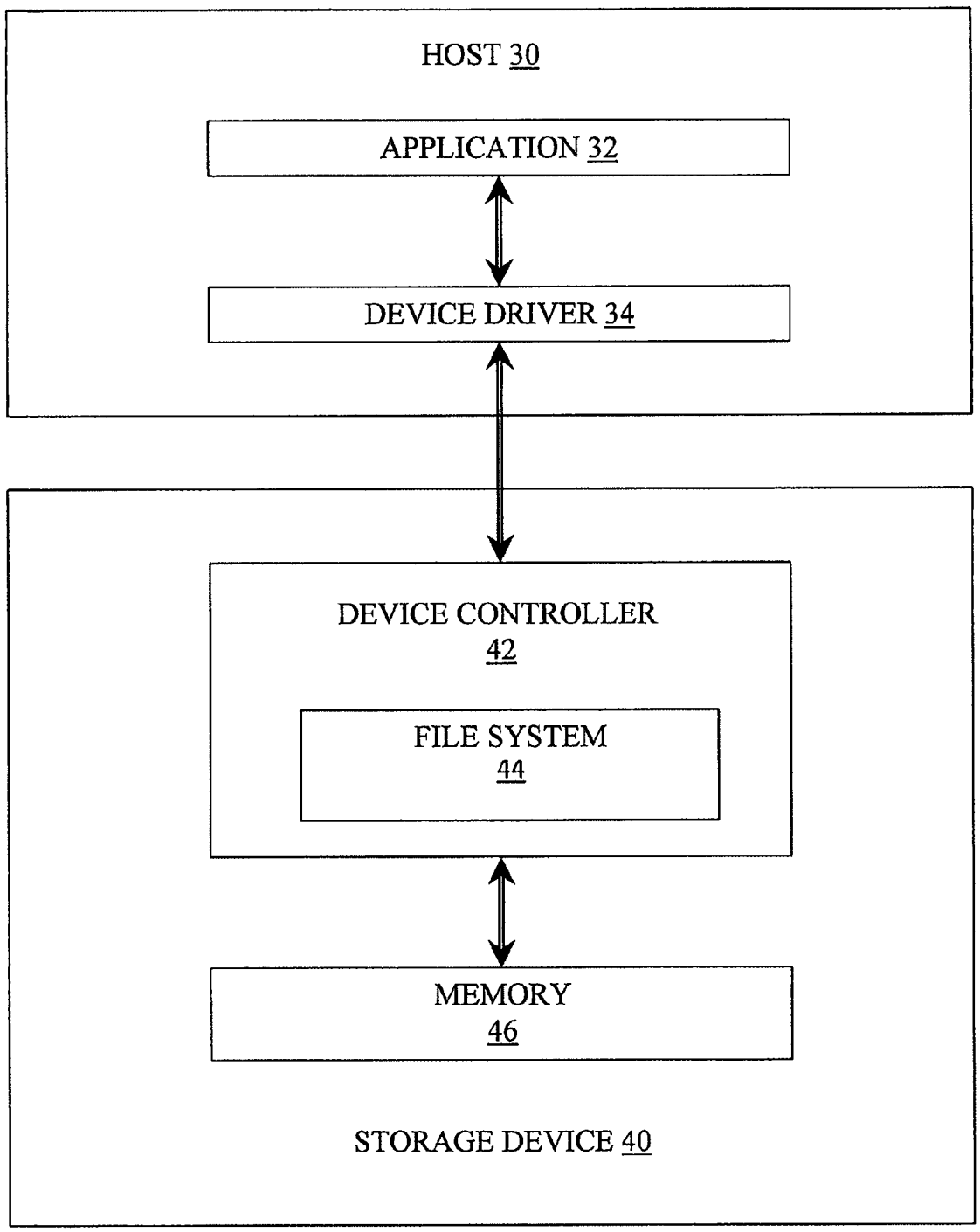
FIG. 2 illustrates the overall architecture of a host system coupled to a data storage device of the present invention.

Referring now to the drawings, FIGS. 1 and 2 contrast the overall architecture of a host system coupled to a prior art data storage device that supports a block protocol, i.e., in which the physical storage medium is managed as blocks according to the block model, with the overall architecture of a host system coupled to a data storage device, of the present invention, that supports a file system protocol, i.e., in which the physical storage medium is managed as files according to the hierarchical file model.

FIG. 1 shows a host system 10 coupled to a prior art data storage device 20. In host system 10, an application 12 reads and writes data files organized in hierarchical fashion in a file system 14. The actual data are stored in a physical data storage medium (memory) 24 in data storage device 20. File system 14 translates file access commands from application 12 into block protocol commands that are sent to data storage device 20 via a device driver 16. In data storage device 20, a device controller 22 receives the block protocol commands. Device controller 22 then reads data from data storage medium 24 and writes data to data storage medium 24 in accordance with these block protocol commands.

FIG. 2 shows a host system 30 coupled to a data storage device 40 of the present invention. In host system 30, an application 32 reads and writes data files organized in hierarchical fashion in a file system 44 that is part of a device controller 42 of data storage device 40. Application 32 sends file access commands to device controller 42 via a device driver 34 in host system 30. The actual data are stored in a physical data storage medium (memory) 46 in data storage device 40. Device controller 42 reads data from data storage medium 46 and writes data to storage medium 46 with reference to the file hierarchy stored in file system 44 and in accordance with the access protocol of data storage medium 46. For example, if data storage medium 46 is a block device such as a magnetic disk, then device controller 42 accesses data storage medium 46 using a block protocol. Note that, as discussed above, when data storage medium 24 of prior art data storage device 20 is a flash storage medium, then device controller 22 necessarily includes enough processing power to allow device 20 to emulate a block device, so it is straightforward to modify such a device 20 to obtain a data storage device 40 of the present invention: device 20 is modified by including file system 44 in device controller 22. Any of the prior art flash disk form factors, for example DiskOnKey (M-Systems, Kfar Saba, Israel), CompactFlash (SanDisk Corporation, Sunnyvale Calif., USA), or Memory Stick (Sony Electronics, Inc., Japan), may be so modified.

In both the architecture of FIG. 1 and the architecture of FIG. 2, the device controllers are direct interfaces to their respective data storage media. The difference between them is that prior art device controller 22 supports a block protocol for accessing data storage medium 24 from host system 10, whereas device controller 42 of the present invention supports a file system protocol for accessing data storage medium 46 from host system 30.

Figure 3:
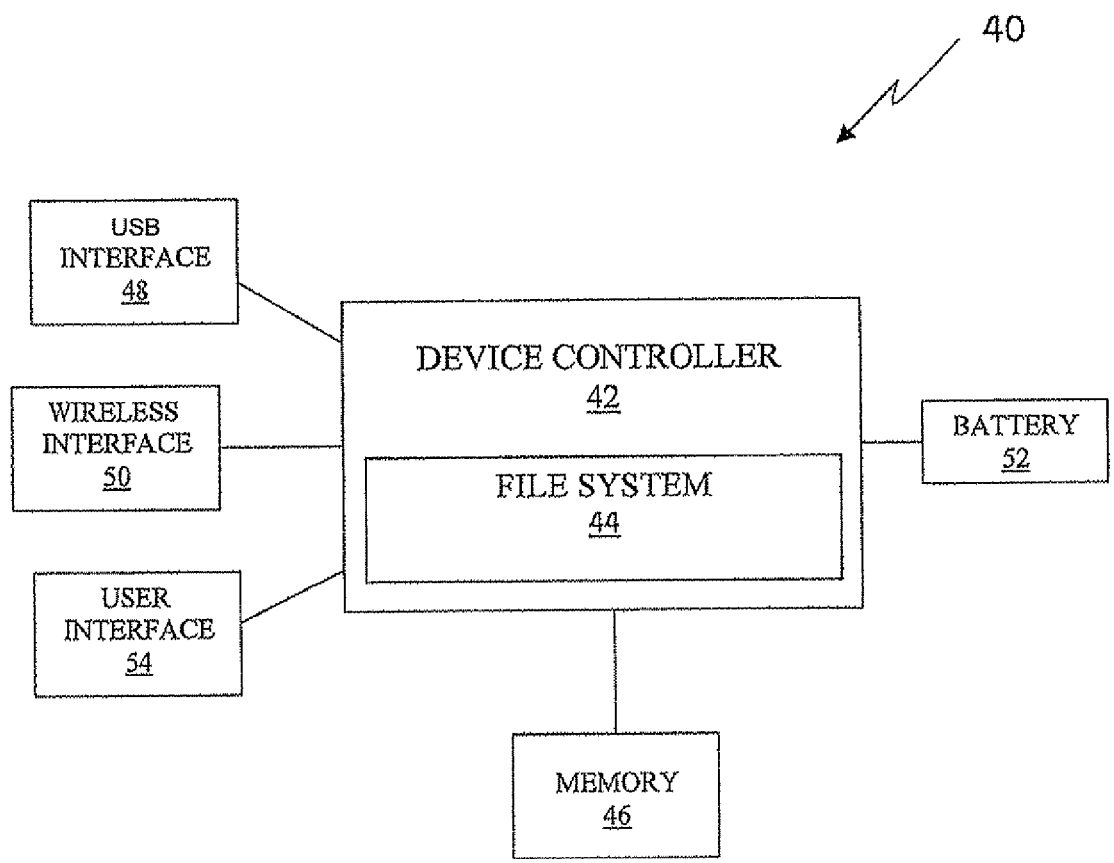
FIG. 3 is a high-level block diagram of a data storage device of the present invention.

FIG. 3 is a more complete high-level block diagram of data storage device 40. In addition to the components illustrated in FIG. 2, data storage device 40 includes a USB interface 48, a wireless interface 50, a user interface 54 and a power source 52. These additional components now will be discussed.

USB interface 48 allows data storage device 40 to be plugged into any host 30 that has a USB socket. Applications 32 running on host system 30 then access the files stored in data storage device 40 using file system protocol commands, as discussed above. Most preferably, device controller 42 also recognizes block protocol commands, to enable host system 30 to access data storage device 40 the same way as host system 10 accesses prior art data storage device 20.

Wireless interface 50 allows two data storage devices 40 to communicate with each other, using file system protocol commands, without the mediation of a host system 30. Such autonomous operation of data storage device 40 requires that data storage device 40 also have its own power source 52 and its own user interface 54. Typically, power source 52 is a battery. User interface 54 is a conventional user interface that includes buttons or a control panel that enable a user to initiate file transfers.

Figure 4:
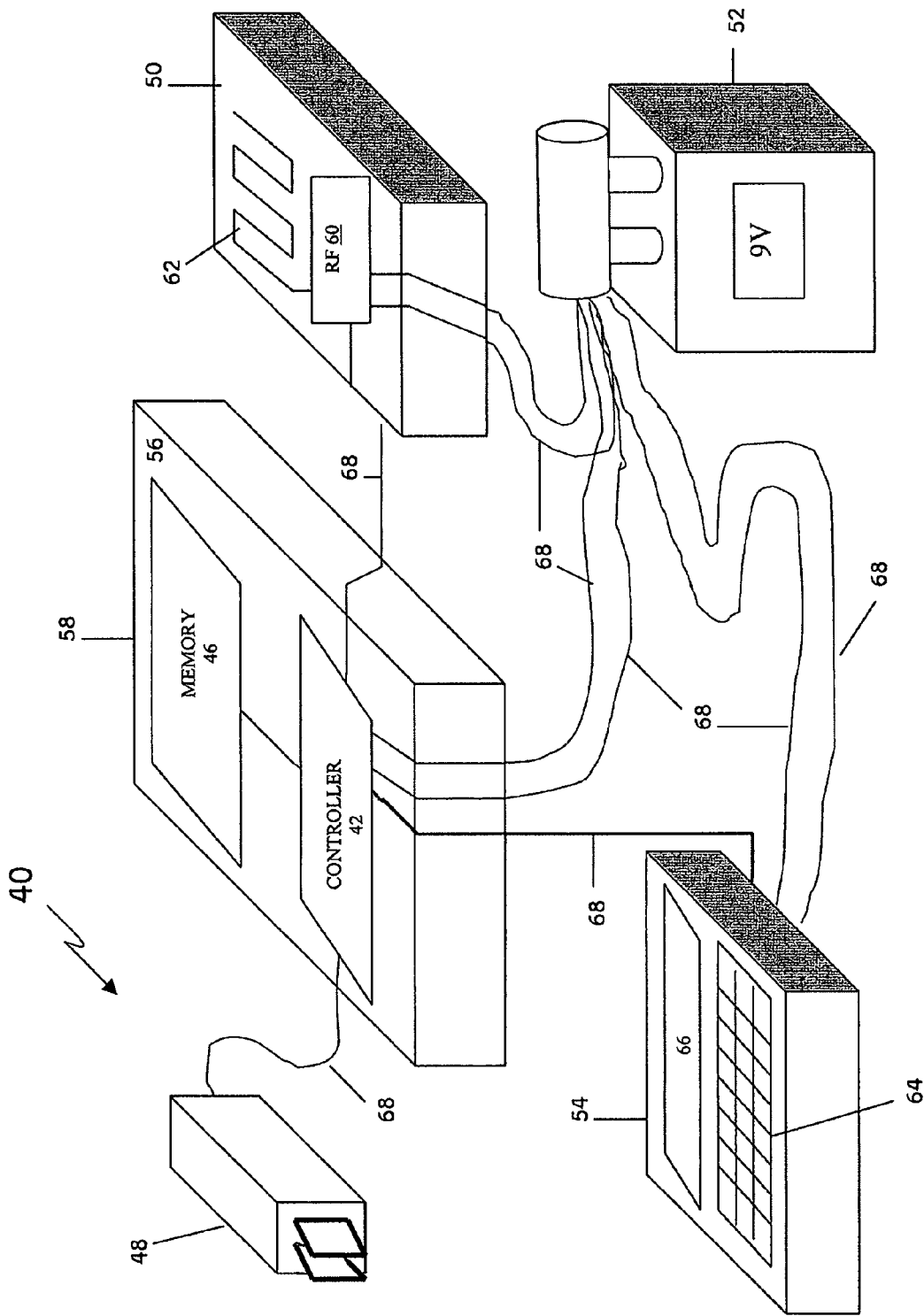
FIG. 4 is a schematic illustration, in perspective view, of the physical structure of the data storage device of FIG. 3.

FIG. 4 illustrates, in schematic perspective view, not to scale, the physical structure of data storage device 40. Device controller 42 and data storage medium 46 are fabricated as integrated circuits on a common substrate: a surface 56 of a semiconductor chip 58. Similarly, wireless interface 50 includes RF circuitry 60 fabricated as an integrated circuit along with an RF antenna 62 on a surface of a second semiconductor chip. User interface 54 includes a control panel 66 or similar data entry means, as well as a display screen 66. Device controller 42, wireless interface 50 and user interface 54 receive power from 9-volt battery 52. Device controller 42, data storage medium 46, USB interface 48, wireless interface 50, user interface 54 and battery 52 are interconnected by electrical conductors 68 as shown.

As noted above, the scope of the present invention includes appliances that include data storage devices such as data storage device 40. Examples of such appliances include mobile telephones, digital cameras, MP3 players and TV remote controls. Such appliances include an internal memory 46 for file storage and are able to act as file servers and so are able to exchange files with other similar appliances. Files may be exchanged either via a physical interface dedicated to this purpose or via a physical interface that is already used by the appliance, for example, the RF interface of a mobile telephone or the USB cable of a digital camera.

The preferred file name syntax of the present invention is the standard file name syntax used by, e.g., the Unix and Microsoft Windows™ operating systems. In this syntax, a file is specified by its path name. A path describes the hierarchy of directories and the file name within the lowest directory. For example, the path "\services\myservices.inf" is the path to a file "myservices.inf in the directory "services" that is a subdirectory of the root directory "\".

Path segments are delimited by "/" (Unix) or "\" (Microsoft Windows™). A path prefixed by "\" is relative to the root directory. A path not prefixed by "\" is relative to the current directory. A segment path of ".." indicated the parent directory of the current directory.

The following commands are sufficient for performing any useful applications:

create_file(<path_name>) returns <file_handle>
open_file(<path_name>) returns <file_handle>
read_file(<path_name>) returns <block_of_data>.
write_file(<file_handle>,<length>,<block_of_data>)
file_size(<file_handle>) returns <file_size>
set_file_position(<file_handle>,<file_position>)
close_file(<file_handle>)
delete_file(<path_name>)
get_current_directory( ) returns <path_name>
set_current_directory(<path_name>)
make_directory(path_name>)
remove_directory(<path_name>)
open_directory(<path_name>) returns <directory_handle>
get_next_directory_entry(<directory_handle>) returns <path_name>

In the most preferred embodiment of data storage device 40 in which data storage medium 46 is a flash storage medium, the preferred command protocol is described within the USB specification, with the basic USB protocol consisting of token, data and handshake packets as described in U.S. Pat. No. 6,148,354. A command consists of at least two data packets: a request packet sent by host 30, and a status packet returned by data storage device 40. The request packet includes a command id field and input parameters relevant to the command. The status packet is returned by data storage device 40 upon completion of the command, and includes at least a status code indicating how the command completed, and output parameters if any.

For example in the open_directory command, the request packet includes three fields:
Command code open_directory
Path length in bytes
Directory path The status packet includes the following two fields:
directory_handle of opened directory
Status code This protocol is a natural extension of the block protocol (identify, read_blocks and write_blocks commands) of U.S. Pat. No. 6,148,354. With the minor precaution that command codes do not clash, this file server protocol coexists with and augments the block protocol of U.S. Pat. No. 6,148,354.

While the invention has been described with respect to a limited number of embodiments, it will be appreciated that many variations, modifications and other applications of the invention may be made.

What is claimed is:

1. A data storage device comprising:
   (a) a data storage medium; and
   (b) a device controller that reads and writes on said data storage medium according to a file system protocol in response to commands of said file system protocol, each said command of said file system protocol having a respective command code, and also according to a block protocol in response to commands of said block protocol, each said command of said block protocol having a respective command code, said command codes of said file system protocol not clashing with said command codes of said block protocol.

2. The data storage device of claim 1, wherein said data storage medium includes at least one flash memory module.

3. The data storage device of claim 1, further comprising:
   (c) a common substrate on which both said data storage medium and said device controller are fabricated.

4. The data storage device of claim 1, further comprising:
   (c) a physical communication interface that supports communication between an external device and said device controller.

5. The data storage device of claim 4, wherein said physical communication interface is a USB interface.

6. The data storage device of claim 4, wherein said physical communication interface is a wireless communication interface.

7. The data storage device of claim 1, wherein said device controller is operative to initiate a data transfer between said data storage medium and an external device, the data storage device further comprising:
   (c) a hardware user interface, that is dedicated to the data storage device, with which a user of the data storage device instructs said device controller to initiate said data transfer.

8. The data storage device of claim 1, further comprising:
   (c) a power source for powering said device controller.

9. The data storage device of claim 1, wherein the data storage device is operative substantially only to store and retrieve data.

10. A data storage device comprising:
    (a) a data storage medium;
    (b) a device controller that is coperative to receive commands of a file system protocol and commands of a block protocol and in response to said commands, to read and write on said data storage medium, said commands being received from an external device, said device controller being operative to initiate a data transfer between said data storage medium and said external device; and
    (c) a hardware user interface, that is dedicated to the data storage device, said hardware user interface including a data entry mechanism with which a user of the data storage device instructs said device controller to initiate said data transfer.

* * * * *